Oct. 9, 1956          J. W. DAWSON          2,766,382
INPUT POWER REGULATORS
Filed Feb. 20, 1953          2 Sheets-Sheet 1
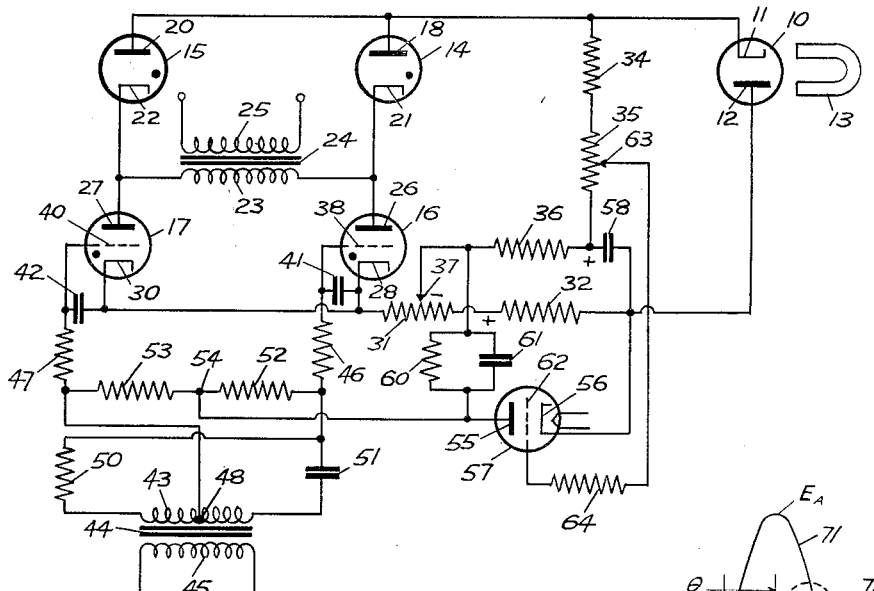
INVENTOR
JOHN W. DAWSON
BY Elmer J. Gorn
ATTORNEY INVENTOR
JOHN W. DAWSON
By Elmer J. Gorn
ATTORNEY

United States Patent Office 2,766,382
Patented Oct. 9, 1956

2,766,382
INPUT POWER REGULATORS

John W. Dawson, Winchester, Mass., assignor to Raytheon Manufacturing Company, Newton, Mass., a corporation of Delaware Application February 20, 1953, Serial No. 337,954

7 Claims. (Cl. 250—36)

This application relates to a circuit for controlling the grid voltage applied to grid-controlled gaseous discharge devices to regulate the power input to a load, such as a magnetron.

In the continuous operation of magnetrons for such purposes as heating by microwave energy, it is important to maintain the input power to the magnetron constant even though the local conditions and the line voltage vary. The principal factors determining the output power are the voltage applied between the anode and cathode of the magnetron and the current passing through this space. This voltage and current can be regulated by the use of the thyratron type of power supply. The power output of such a supply can be regulated by applying both a D. C. and A. C. bias to the grids of the thyratron. The resulting bias is out of phase with the A. C. voltage applied to the plates of the thyratrons. With such an arrangement, the conduction period of the thyratron can be controlled by controlling the D. C. bias. In the circuit of the present invention, the peak voltage across the magnetron is used as the target with which a voltage derived from the average D. C. magnetron current is compared and the resulting potential applied as the grid bias of a vacuum tube, the plate voltage of which is obtained from the anode voltage of the magnetron. This tube serves to determine the D. C. component of the bias on the grids of the thyratron and, thus, the average power produced by these thyratrons.

The circuits of this invention have the advantage over the conventional circuits for this purpose in that they do not require a separate source of target voltage or a separate power supply for the plate of the control tube. This is accomplished with low cost components.

Figure 5:
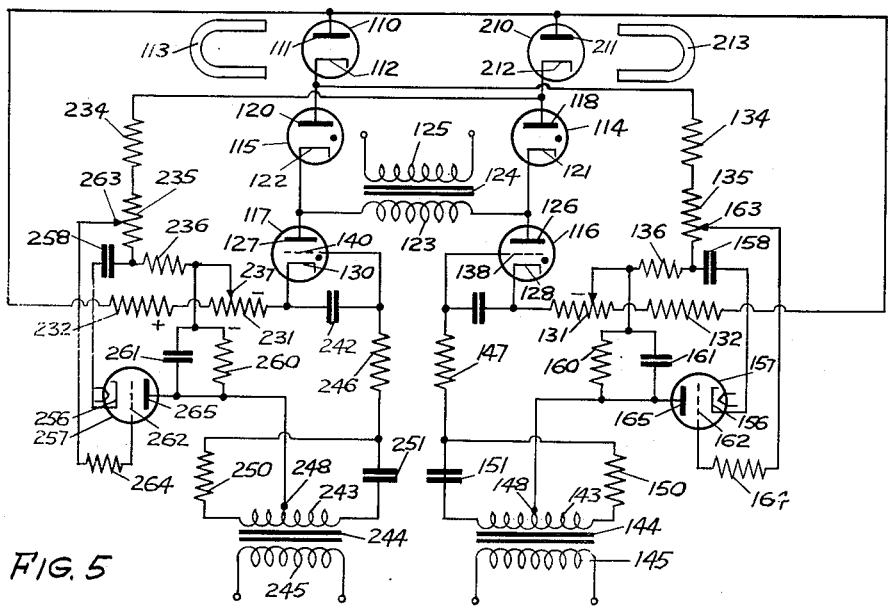
Figure 6:
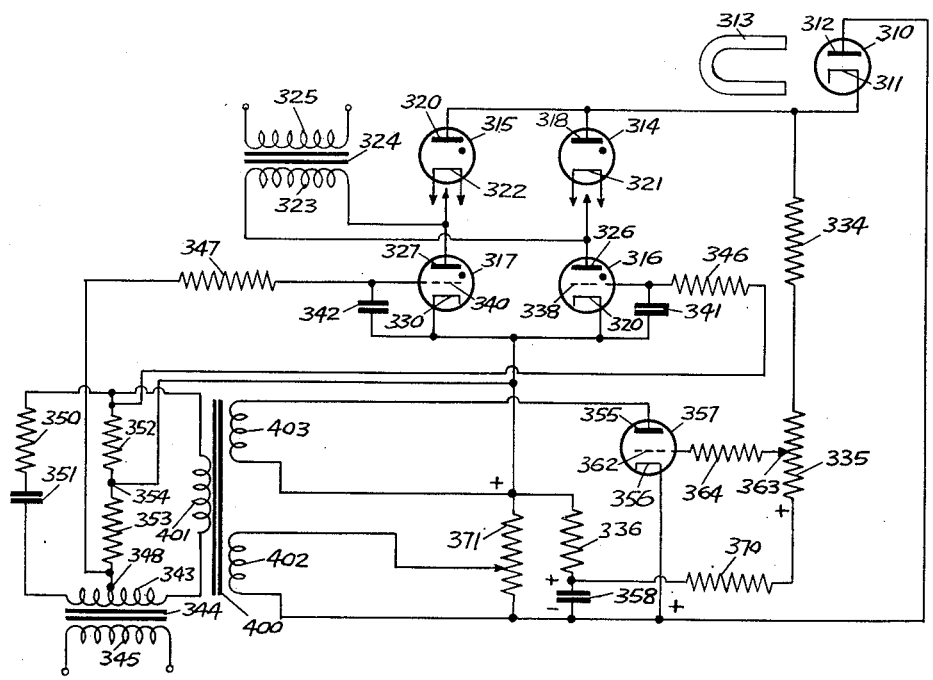

Other and further advantages of this invention will be apparent as the description thereof progresses, reference being had to the accompanying drawings wherein:

Fig. 1 is a schematic diagram of the circuit of a power supply for a magnetron oscillator embodying the invention;

Fig. 2 shows the wave forms of the applied plate voltage, critical grid bias, and the A. C. grid swing superimposed on a D. C. bias for a thyratron;

Figs. 3a, 3b, and 3c show the effect of varying line voltage upon the average value of the plate voltage;

Figs. 4a, 4b, and 4c show the effect of varying line voltage upon the average value of the plate current;

Fig. 5 is a schematic diagram of a modification of the invention utilizing two magnetrons; and Fig. 6 is a schematic diagram showing a modification of the invention utilizing a saturable reactor.

In Fig. 1, the reference numeral 10 designates a magnetron having a cathode 11 and an anode 12 provided with a magnetic field by a permanent magnet 13. The cathode is supplied with a high negative voltage by the power supply comprising diodes 14 and 15 and grid-controlled gaseous discharge tubes, such as thyratrons 16 and 17. The plates 18 and 20 of the diodes 14 and 15 are connected to the cathode 11 of the magnetron 10.

The cathodes 21 and 22 are connected together through the secondary 23 of a transformer 24, the primary 25 of which is connected to a source of power. The plates 26 and 27 of the thyratrons 16 and 17 are also connected through the secondary 23 of the transformer 24. The cathodes 28 and 30 are connected together and to the plate 12 of the magnetron 10 through a potentiometer 31 and resistor 32. The cathode 11 of the magnetron 10 is also connected to the anode 12 through resistor 34, potentiometer 35, resistor 36, the arm 37 of potentiometer 31, and the resistor 32. The grids 38 and 40 of the thyratrons 15 and 16 are coupled to cathodes 28 and 30 through capacitors 41 and 42. In addition, a fixed A. C. bias is applied to the grids 38 and 40 through resistors 46 and 47 from the secondary 43 of a transformer 44, the primary 45 of which is connected to a source of power. This A. C. bias is applied to each grid 38 and 40 of the thyratrons 16 and 17 out of phase with the plate voltage applied through the transformer 24. This phase shift is accomplished by connecting the center tap 48 of the secondary 43 to the grid 40 through the resistor 47. The grid 38 is connected to one end of the secondary 43 through a resistor 50 and coupled to the other end of the secondary 43 through a capacitor 51. The resistors 46 and 47 are connected together through resistors 52 and 53. The connecting point 54 of the resistors 52 and 53 is connected to the anode 12 of the magnetron 10 through the plate 55 to cathode 56 space of the control tube 47. The resistor 36 is coupled to the resistor 32 through a capacitor 58. The plate 55 of the tube 57 is connected to the resistor 36 through a resistor 60 shunted by a capacitor 61. The grid 62 of the tube 57 is connected to the arm 63 of the potentiometer 35 through a resistor 64.

In operation, the tube 57 is utilized to maintain the average magnetron current constant by deriving a grid bias for this tube from a comparison of a sample of the peak magnetron anode voltage with a voltage derived from the average magnetron plate current. The voltage proportional to the average magnetron current is obtained at the arm 37 of the potentiometer 31, and represents the drop across the portion of the potentiometer 31 to the right of the arm and also that across the resistor 32. This potential is averaged by the capacitor 58 connected in series with the resistor 36. This voltage is also used as the plate voltage for the control tube 57 as the arm 37 is connected to the plate 55 through resistor 60. The voltage proportional to the peak voltage is obtained from the arm 63 of the potentiometer 35. The resistor 60 shunted across the capacitor 61 makes the time constant of that circuit several times greater than the interval between magnetron current pulses. This has an integrating effect. The combination of resistor 36 and capacitor 58 also has an integrating effect, making the voltage across the capacitor 58 proportional to the average magnetron current. The polarity of this voltage is positive with respect to the cathode 56 of the control tube 57. The voltage at the arm 37 of the potentiometer 31 is negative with respect to the cathode 56 of the tube 57. These voltages are added algebraically to give a voltage that is equal to their difference. This voltage is applied to the grid 62 of the tube 57. The tube 57 acts as a variable resistor which controls the amount of charge in the capacitor 61. The D. C. voltage across the capacitor 61 is added to the A. C. voltage across either resistor 52 or resistor 53 connected in series to bias the grids 38 and 40 of the thyratrons 15 and 17.

The initial D. C. bias on the grids 38 and 40 of the thyratrons 16 and 17 is obtained from the charge on the capacitor 61. The effect of the combination of D. C. and A. C. bias on the thyratron firing cycle is best seen with reference to Fig. 2. In this graph, time is plotted along the horizontal line 70 and either current or voltage is plotted vertically. The voltage supplied to the plates of the thyratron is shown as the solid line 71 and reaches a maximum value $E_A$. The dotted line 72 represents the A. C. bias delayed, with respect to the anode voltage, by an angle $\phi$ by the resistor 50 and capacitor 51 in the secondary of the transformer 44, and has a value $e_g$. The negative D. C. bias obtained from the capacitor 61 has a value $e_1$ and serves to displace the curve of $e_g$ downward to the position shown by the solid line 73. The grid potential $E_c$, required to fire the thyratron at the various plate voltages, is shown by the dashed line 74. It will be seen that the line 72 intersects the line 74 at a point 75 representing a firing angle of $\theta_1$ degree, while the solid line 73 intersects the line 74 at a point 76 representing a firing angle of $\theta_2$ degrees. Thus, it will be seen how varying the D. C. bias will vary the firing angle of the thyratrons.

In the circuit of the invention, when the average anode current increases relative to the anode voltage of the magnetron, a higher negative potential develops across the capacitor 61 and is applied to the grid of the thyratrons, causing them to conduct later and produce less input power for the magnetron which will reduce the plate current of the magnetron. If the anode current decreases relative to the anode voltage, a smaller negative potential will be developed across the capacitor 61 and the thyratrons will fire earlier, producing more power. Thus, the input power to the magnetron is maintained at a predetermined value. The tube 57 acts as an amplifier for small differences in voltage appearing at its grid, so that small changes in anode current will be corrected by relatively large changes in the grid bias on the thyratrons.

Figs. 3a, 3b, and 3c show the values of the rectifier output $E_A$, the magnetron anode voltage $E_p$, and Figs. 4a, 4b, and 4c show the values of the magnetron plate current $I_p$ for increasing line voltage in a representative case. It will be seen that, as $E_A$ increases, the value of $E_p$ remains relatively constant and that the value of $I_p$ rises slightly, maintaining the average input power relatively constant.

Before the plate voltage is applied to the thyratrons 16 and 17, the grid current due to the phase shift grid-swing voltage charges up the capacitor 61 in a polarity such as to bias the thyratrons. When the plate voltage is applied to the thyratrons, the regulator action takes over. If the line voltage is very low, tube 57 becomes biased practically to cutoff. The voltage on the capacitor 61 is still too low to allow the thyratrons to conduct early enough to maintain the magnetron current constant. The buffer voltage drop across the low ohmic resistance of the left-hand portion of the potentiometer 31 tends to buck the voltage across the capacitor 61 so that the D. C. bias on the grids 38 and 40 of the thyratrons is effectively lowered and permits the thyratrons to fire earlier.

If the voltage on the capacitor 61 were zero when the full plate voltage was applied to the thyratrons, they would conduct fully and the resulting large magnetron current could damage the magnetron if it persisted for any length of time. This dangerous condition is prevented in the circuit of the present invention by the phase shift voltage applied between the cathodes and grids of the thyratrons which causes grid current to flow, charging up capacitor 61 to the proper polarity to bias the thyratrons. This voltage is sufficient to permit the thyratrons to reach their proper operating points within a few half cycles after plate voltage is applied. The desired magnetron current can be determined by the setting of the arm 63 of the potentiometer 35.

Fig. 5 shows a modification of the circuit of the invention so that it may be used with two magnetrons designated by the numerals 110 and 210. The control circuit is essentially that of Fig. 1 with one such circuit being used for each thyratron. Corresponding components are shown with the same number as in Fig. 1 with either 100 or 200 added, depending upon the magnetron with which that particular component is associated. It will be noted that the two magnetrons 110 and 210 are used to replace two of the rectifying legs of a single phase full-wave rectifying circuit without using a center tap transformer for the anode voltage supply and with the output substantially shorted, since the two magnetron rectifiers are themselves the load. The rectifiers 114 and 115 are not essential, but are inserted in the circuit to prevent the application of extremely heavy current to one of the two magnetrons should the other become gassy. It will be noted that the resistors 52 and 53 of Fig. 1 have been omitted from the circuit of Fig. 5, and the center taps 148 and 248 of the transformers 144 and 244 are connected directly to the plates 165 and 265 of tubes 157 and 257. This is because only one thyratron, 114 or 115, is used for each magnetron 110 or 210.

Fig. 6 shows a modification of the circuit of Fig. 1 using a saturable reactor for controlling the A. C. bias voltage in accordance with the two D. C. voltages. As before, the voltage proportional to the peak magnetron anode voltage is obtained at the arm 363 of the potentiometer 335, from across a portion of the potentiometer, resistors 370, 336, and 371, and is applied to the grid 362 of the vacuum tube 357. In addition, a voltage proportional to the average magnetron anode current is developed across the resistor 371 and capacitor 358. The voltage drop across the resistor 371 determines the plate voltage for the tube 357. The voltage across the capacitor 358 has a positive polarity while the voltage proportional to the peak anode voltage across the potentiometer 335 has a negative polarity. The algebraic sum of these voltages is applied as a bias on the grid 362 of the tube 357. The saturable reactor 400 has an A. C. winding 401 connected into a network comprising resistor 350 and capacitor 351 shunted by resistors 352 and 353. This network comprises a series resonance circuit and is connected to the secondary 343 of the transformer 344 that supplies the A. C. bias to the grids 338 and 340 of the thyratrons 316 and 317. The variation of the phase shift by the D. C. voltage is accomplished in the control circuit by the variation in the reactive component of the saturable reactor 400 by means of D. C. windings 402 and 403. When this reactance is high, the thyratron-to-grid voltage is delayed so that the thyratron fires late and delivers low average current to the magnetron.

In starting, the saturable reactor 400 has a high reactance and the thyratrons 316 and 317 will fire very late in the voltage wave. When the magnetron voltage precedes the starting current, the winding 402 connected in shunt with the plate circuit resistor 371 of the control tube 357 will partially saturate and thereby reduce the reactance of the saturable reactor 400 and advance the firing angle. However, when the firing angle $\theta$ advances up to near the correct point, the step-function output of the control tube 357 will supply a magnetomotive force through the winding 403 in opposition to that caused by the winding 402. The desired regulating point is that point to which the two D. C. coils 402 and 403 apply a net saturating force to the saturable reactor 400 sufficient to cause the correct amount of plate current to flow. By the operation of the control circuit of this invention, any departure from this correct value of plate current will result, through the action of the control tube 357, in a very rapid change in the net magnetomotive force of the saturable reactor 400 and will shift the firing time of the thyratrons radically to correct conditions back to the desired value.

This invention is not limited to the particular details of construction, materials and processes described, as many equivalents will suggest themselves to those skilled in the art. It is, accordingly, desired that the appended claims be given a broad interpretation commensurate with the scope of the invention within the art.

What is claimed is:

1. In combination, a load device having an inherently constant voltage characteristic, means to apply substantially constant power to said device comprising a grid-controlled gaseous discharge device, means for controlling the phase of the voltage applied to the grid of the grid-controlled gaseous discharge device relative to the voltage applied to the plate of said device comprising an electron discharge device having a plate, a grid and a cathode, means utilizing a portion of the voltage across said load device as the anode potential of the electron discharge device, means for deriving a potential proportional to the peak potential across the load device, and means for combining these potentials in opposite polarity and applying the resulting voltage to the grid of the electron discharge device to control the phase of the voltage applied to the grid of the gaseous discharge device with reference to the voltage applied to the plates of this device to maintain the average current through the load device substantially constant.

2. In combination, an electron discharge device having a resonant anode structure and a cathode, means for supplying a magnetic field across said discharge device to thereby cause oscillations in said device, means to apply a voltage between the anode and cathode of said device comprising a grid-controlled gaseous discharge device, means for controlling the phase of the voltage applied to the grid of the grid-controlled gaseous discharge device relative to the voltage applied to the plate of said device comprising a second electron discharge device having a plate, a grid and a cathode, means utilizing a portion of the anode voltage of the first said electron discharge device as the anode potential of the second-mentioned electron discharge device, means for deriving a potential proportional to the peak anode potential of the first electron discharge device, means for deriving a potential proportional to the average anode current of the first electron discharge device, and means for combining these potentials in opposite polarity and applying the resulting voltage to the grid of the second electron discharge device to control the phase of the voltage applied to the grid of the gaseous discharge device with reference to the voltage applied to the plates of this device to maintain the average anode current through the first electron discharge device substantially constant.

3. In combination, a plurality of electron discharge devices, each having a resonant anode structure and a cathode, means for supplying a magnetic field across said discharge devices to thereby cause oscillations in said devices, means to apply a voltage between the anode and cathode of each said device comprising a grid-controlled gaseous discharge device for each said electron discharge device, means for controlling the phase of the voltage applied to the grid of each grid-controlled gaseous discharge device relative to the voltage applied to the plate of said device comprising a second set of electron discharge devices, each associated with a gaseous discharge device and each having a plate, a grid and a cathode, means utilizing a portion of the anode voltage of the first set of said electron discharge devices as the anode potential of its associated second-mentioned electron discharge device, means for deriving a potential proportional to the peak anode potential of each of the first set of electron discharge devices, and means for combining these potentials in opposite polarity and applying the resulting voltage to the grid of each second set of electron discharge devices to control the phase of the voltage applied to the grid of the associated gaseous discharge device with reference to the voltage applied to the plates of this device to maintain the average anode current through the associated one of the first set of electron discharge devices substantially constant.

4. In combination, a load device having an inherently constant voltage characteristic, means to apply substantially constant power to said device comprising a grid-controlled gaseous discharge device, means for controlling the phase of the voltage applied to the grid of the grid-controlled gaseous discharge device relative to the voltage applied to the plate of said device comprising means for applying an alternating voltage to the grid of said gaseous discharge device having a predetermined phase lag with respect to the plate voltage, an electron discharge device having a plate, a grid and a cathode, means utilizing a portion of the voltage across said load device as the anode potential of the electron discharge device, means for deriving a potential proportional to the peak potential across the load device, means for deriving a potential proportional to the average current through the load device, means for combining these potentials in opposite polarity and applying the resulting voltage to the grid of the electron discharge device to produce a direct current potential, and means to combine this potential with the alternating grid voltage to control the phase of the voltage applied to the grid of the gaseous discharge device with reference to the voltage applied to the plate of this device to maintain the average current through the load device substantially constant.

5. In combination, an electron discharge device having a resonant anode structure and a cathode, means for supplying a magnetic field across said discharge device to thereby cause oscillations in said device, means to apply a voltage between the anode and cathode of said device comprising a grid-controlled gaseous discharge device, and means for controlling the phase of the voltage applied to the grid of the grid-controlled gaseous discharge device relative to the voltage applied to the plate of said device comprising a second means for applying an alternating voltage to the grid of said gaseous discharge device having a predetermined phase lag with respect to the plate voltage, said second means comprising a second electron discharge device having a plate, a grid and a cathode, means utilizing a portion of the anode voltage of the first said electron discharge device as the anode potential of the second electron discharge device, means for deriving a potential proportional to the peak anode potential of the first electron discharge device, means for deriving a potential proportional to the average anode current of the first electron discharge device, means for combining these potentials in opposite polarity and applying the resulting voltage to the grid of the second electron discharge device to produce a direct current potential, and means to combine this potential with the alternating grid voltage to control the phase of the voltage applied to the grid of the gaseous discharge device with reference to the voltage applied to the plates of this device to maintain the average anode current through the first electron discharge device substantially constant.

6. In combination, a load device having an inherently contant voltage chacteristic, means to apply substantially contant power to said device comprising a grid-controlled gaseous discharge device, means for controlling the phase of the voltage applied to the grid of the grid-controlled gaseous discharge device relative to the voltage applied to the plate of said device comprising an electron discharge device having a plate, a grid and a cathode, means utilizing a portion of the voltage across said load device as the anode potential of the electron discharge device, said means comprising an impedance in the load circuit, means for deriving a potential proportional to the peak potential across the load device, said means comprising an impedance, means for deriving a potential proportional to the average current through the load device, means for combining these potentials in opposite polarity comprising a capacitor connected between the anode of the electron discharge device and the said impedance, and means applying the resulting voltage to the grid of the electron discharge device to control the phase of the voltage applied to the grid of the gaseous discharge device with reference to the voltage applied to the plates of this device to maintain the average current through the load device substantially constant.

7. In combination, an electron discharge device having a resonant anode structure and a cathode, means for supplying a magnetic field across said discharge device to thereby cause oscillations in said device, means to apply a voltage between the anode and cathode of said device comprising a grid-controlled gaseous discharge device, means for controlling the phase of the voltage applied to the grid of the grid-controlled gaseous discharge device relative to the voltage applied to the plate of said device comprising a second electron discharge device having a plate, a grid and a cathode, means utilizing a portion of the anode voltage of the first said electron discharge device as the anode potential of the second-mentioned electron discharge device, said means comprising an impedance in the load circuit of the first-mentioned electron discharge device, anode-to-cathode means for deriving a potential proportional to the peak anode potential of the first electron discharge device, said means comprising an impedance across the anode-to-cathode means of the first-mentioned electron discharge device, means for deriving a potential proportional to the average anode current of the first electron discharge device, means for combining these potentials in opposite polarity comprising a capacitor connected between the anode of the second electron discharge device and the said impedances, and means for applying the resulting voltage to the grid of the electron discharge device to control the phase of the voltage applied to the grid of the gaseous discharge device with reference to the voltage applied to the plates of this device to maintain the average anode current through the first electron discharge device substantially constant.

References Cited in the file of this patent

UNITED STATES PATENTS

| | | |
|---|---|---|
| 2,012,884 | Leroy | Aug. 27, 1935 |
| 2,372,964 | Livingston | Apr. 3, 1945 |
| 2,411,162 | King | Nov. 19, 1946 |
| 2,448,527 | Hansell | Sept. 7, 1948 |
| 2,515,634 | Dawson | July 18, 1950 |
| 2,609,497 | Dawson | Sept. 2, 1952 |